F. B. COMINS.
HUMIDIFIER.
APPLICATION FILED JUNE 1, 1909.
952,234.
Patented Mar. 15, 1910.
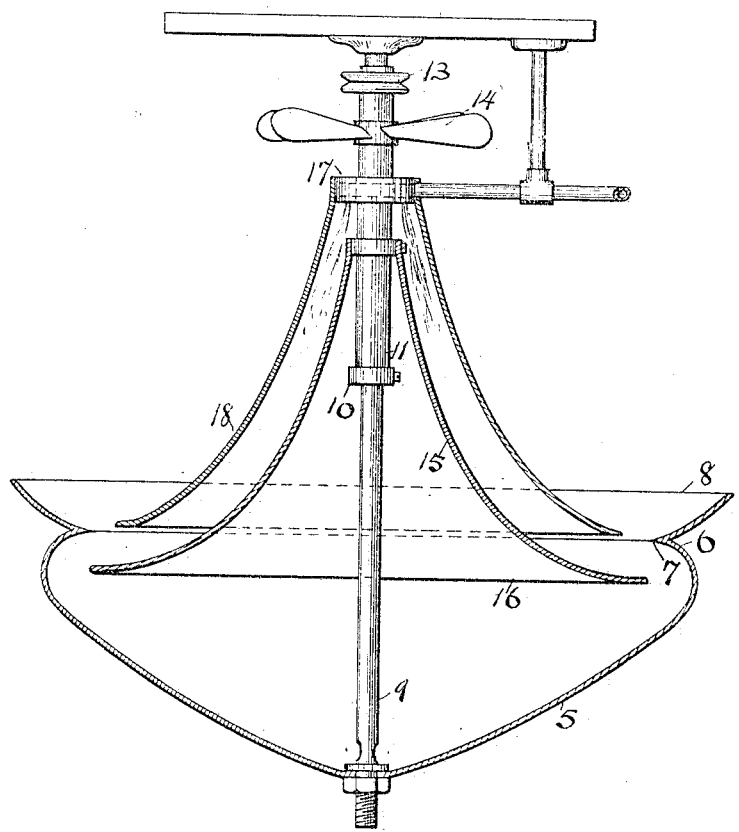
Witnesses.
Thomas M. Hait
W. W. Harrington
Inventor.
Frank B. Comins
By Henry J. Miller
atty.

UNITED STATES PATENT OFFICE.

FRANK B. COMINS, OF SHARON, MASSACHUSETTS.

HUMIDIFIER.

952,234.  Specification of Letters Patent.  Patented Mar. 15, 1910.

Application filed June 1, 1909. Serial No. 499,368.

*To all whom it may concern:*

Be it known that I, FRANK B. COMINS, of Sharon, in the county of Norfolk and State of Massachusetts, have invented a new and useful Improvement in Humidifiers, of which the following is a specification, reference being had to the accompanying drawing, forming part thereof.

This invention refers to improvements in a humidifying apparatus, so called, in which moisture is broken into spray by mechanical means and is then taken up by currents of air and distributed through a considerable area by the currents of air.

The object of the invention is to provide an efficient and economical device which will be practical in its operation.

The invention consists in a rotatable water distributer embraced by a drip compartment or chamber having a deflector above the edge of the distributer and a stationary air shield above the water distributer constructed to direct currents of air toward said deflector whereby the moisture distributed and broken up by the centrifugal action of the water distributer is directed toward said air shield and the currents of air passing over said air shield take up such moisture and carry it away from the machine.

The drawing represents a vertical sectional view of the improved humidifier in which—

5 represents the drip receptacle having the inwardly curving wall 6, to form the contracted shoulder 7 and furnished above said shoulder with the deflector 8. Secured at the axis of the drip receptacle is the sustaining tube 9 having a collar 10 and journaled on said rod is the sleeve 11, supported by the collar 12 having the pulley 13, the fan 14 and the conical water distributer 15 having a lower somewhat flattened surface 16. Between the fan 14 and the upper end of the distributer 15, is the annular water supply pipe 17, furnished with the depending conical air shield 18.

Water is admitted through the perforations in the water supply pipe 17 and flows in comparatively fine streams on to the surface of the distributer 15 and upon the rotation of the sleeve 11 and its water distributer 15 the water is directed outward by centrifugal action and at the same time moves downward until it strikes the curved shoulder of the drip receptacle, then rebounding in a finer spray of which a considerable body is formed between the edge of the air shield 18 and the shoulder 7. Air impelled by the fan 14 passes over the surface of the deflector 8 and is directed outward by the lower flaring portion of said shield, such air takes up a considerable quantity of the moisture as it passes from the edge of the shield 18 toward the deflector 8 and also creates a suction which draws moisture through the annular channel formed between such parts.

Having thus described my invention, I claim as new and desire to secure by Letters Patent:

1. A humidifier comprising a rotatable moisture distributing element, a compartment in which said element is rotatable and an air shield located at a distance above such water distributing element.

2. A humidifier comprising a drip receptacle in combination with a rotatable water distributer, an air shield fixed against rotation and a fan for forcing air against said shield, as and for the purpose described.

3. A humidifier comprising a rotatable conical moisture distributing member, means for delivering moisture to the surface of said element, and a cone embracing said moisture distributing element.

4. A humidifier comprising rotatable conical means for distributing moisture centrifugally, and fixed means for directing air centrifugally to receive said moisture, substantially as described.

FRANK B. COMINS.

Witnesses:
  CHARLES B. CUMMINGS,
  HENRY J. MILLER.